United States Patent
Inami et al.

(10) Patent No.: US 9,783,132 B2
(45) Date of Patent: Oct. 10, 2017

(54) SIDE DOOR TRIM FOR VEHICLE

(71) Applicant: TOYOTA BOSHOKU KABUSHIKI KAISHA, Aichi-ken (JP)

(72) Inventors: Shin Inami, Aichi-ken (JP); Shigeo Ichitsuka, Aichi-ken (JP); Koya Yabuta, Aichi-ken (JP); Sunao Kinoshita, Aichi-ken (JP); Tsuyoshi Yamaguchi, Aichi-ken (JP); Takanori Isaka, Mie-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/333,705

(22) Filed: Oct. 25, 2016

(65) Prior Publication Data

US 2017/0120844 A1    May 4, 2017

(30) Foreign Application Priority Data

Oct. 30, 2015  (JP) .................................. 2015-213751

(51) Int. Cl.
*B60R 13/02* (2006.01)
*B60R 7/04* (2006.01)

(52) U.S. Cl.
CPC .......... *B60R 13/0243* (2013.01); *B60R 7/046* (2013.01)

(58) Field of Classification Search
CPC .. B60R 13/0243; B60R 7/046; B60R 21/0428
USPC ..................................... 296/146.7, 153, 1.09
See application file for complete search history.

(56) References Cited

U.S. PATENT DOCUMENTS

| | | | | |
|---|---|---|---|---|
| 7,775,584 B2* | 8/2010 | Hughes, Jr. | ............ | B60N 2/466 296/1.09 |
| 2001/0025456 A1* | 10/2001 | Furuyama | ............. | B60J 5/0416 49/502 |
| 2003/0116993 A1* | 6/2003 | Skarb | ...................... | B29C 44/12 296/146.7 |
| 2009/0134659 A1* | 5/2009 | Hall | ...................... | B60J 5/0434 296/146.7 |
| 2010/0327646 A1* | 12/2010 | Hori | ..................... | B60N 2/4235 297/411.21 |

FOREIGN PATENT DOCUMENTS

| | | | | |
|---|---|---|---|---|
| JP | 5521767 | 6/2014 | | |
| JP | 2014151836 A | * 8/2014 | ............. | B60R 13/02 |

* cited by examiner

*Primary Examiner* — Jason S Morrow
(74) *Attorney, Agent, or Firm* — Greenblum & Bernstein, P.L.C.

(57) ABSTRACT

A side door trim for a vehicle includes an armrest and a wall component. The armrest includes a top wall for supporting an arm of an occupant of the vehicle. The wall component is for forming a portion of a sidewall of a vehicle compartment. The wall component includes a lower wall portion located below the armrest and a supporting portion for supporting the top wall of the armrest from below. The supporting portion extends from an upper end of the lower wall portion of the wall component adjacent to a lower end of the armrest toward a lower surface of the top wall of the armrest.

15 Claims, 7 Drawing Sheets

SIDE DOOR TRIM FOR VEHICLE

CROSS REFERENCE TO RELATED APPLICATION

This application claims priority from Japanese Patent Application No. 2015-213751 filed on Oct. 30, 2015. The entire contents of the priority application are incorporated herein by reference.

TECHNICAL FIELD

The present disclosure relates to a side door trim for a vehicle.

BACKGROUND

Many vehicular door trims including armrests have tolerances to loads applied to the armrest from above. For example, a side plate that extends downward from a back surface (a lower surface) of a top wall of an armrest (a support) may be provided to achieve a tolerance to a load applied to the armrest from above. Such a side plate may be integrally formed with the armrest. The side plate extends downward from a portion of the lower surface of the top wall of the armrest at about middle of the lower surface in a width direction of a vehicle. A lower end of the side plate is fixed to an energy absorbing (EA) member on a back surface (a surface on an outer side of a vehicle compartment) of a lower trim (a lower board), which is a separate component.

In general, an armrest requires a tolerance to a load from above because an occupant of a vehicle may place his or her arm on an upper surface of the armrest. However, it is preferable that the armrest has a lower tolerance so that the armrest bends in a width direction of the vehicle in a side collision to absorb a side impact to protect the occupant. The armrest of the known door trim has not only a tolerance to a load from above but also a tolerance to a side impact. The side plate is integrally formed with the armrest and the upper end of the side plate is fixed to the middle portion of a top wall of the armrest with respect to the width direction of the vehicle. Therefore, the armrest, especially a portion of the armrest around the top wall, is less likely to bend in the width direction of the vehicle sufficiently to absorb the side impact.

Furthermore, the side plate that extends downward from the lower surface of the top wall of the armrest is fixed to the EA member disposed on the outer surface of the lower trim on the outer side of the vehicle compartment. Namely, the side plate, the armrest, and the lower trim (including the EA member) are connected together without any gaps such that they form a closed space. According to this configuration, the tolerance of the armrest improves. As a result, the side impact absorption of the armrest decreases.

Still furthermore, the side plate that is integrally formed with the armrest extends in the direction substantially perpendicular to the direction in which molds used for forming the armrest are opened (corresponding to the width direction of the vehicle when the door trim is installed in the vehicle). Therefore, an undercut process such as sliding needs to be performed for a portion of the door trim between a surface of the armrest on the interior side of the vehicle and the side plate. This makes the forming of the door trim complicated.

SUMMARY

The present invention was made in view of the foregoing circumstances. An object is to provide a side door trim for a vehicle which includes an armrest having a high tolerance to a load from above but a low tolerance to a side impact.

The side door trim includes an armrest and a wall component. The armrest includes a top wall for supporting an arm of an occupant of the vehicle. The wall component is for forming a portion of a sidewall of a vehicle compartment of the vehicle. The wall component includes a lower wall portion located below the armrest and a supporting portion for supporting the top wall of the armrest from below. The supporting portion extends from an upper end of the lower wall portion of the wall component adjacent to a lower end of the armrest toward a lower surface of the top wall of the armrest.

The supporting portion for supporting the top wall of the armrest from below is a portion of the wall component, that is, a component different from the armrest. Namely, the armrest is tolerant to a downward force applied to the top wall of the armrest from above with support by the component different from the armrest disposed below the armrest. Furthermore, in comparison to a configuration in which the supporting portion is formed integrally with the armrest, move of the supporting portion in a width direction of the vehicle is less likely to be restricted when the armrest receives side impact. Therefore, the armrest easily collapses. Because the supporting portion is a portion of a component different from the armrest, the supporting portion is less likely to restrict a collapse of the armrest when the armrest receives the side impact. Namely, the armrest can have a larger dimension in the width direction of the vehicle in comparison to the known configuration for easy collapse during side impact and thus the armrest can have a higher shock absorbing capability in comparison to the known configuration.

According to technologies described herein, a side door trim for a vehicle which includes an armrest having a high tolerance to a downward force to the armrest from above but a low tolerance to a side impact is provided.

DETAILED DESCRIPTION

First Embodiment

A first embodiment will be described with reference to FIGS. 1 to 7. In this section, a side door trim 1 installed in a vehicle will be described. Letters F and R in FIGS. 1 to 3 indicate a front of a vehicle and a rear of the vehicle, respectively. Terms IN and OUT in FIGS. 4 to 7 indicate an interior side of the vehicle and an exterior side of the vehicle, respectively.

Figure 1:
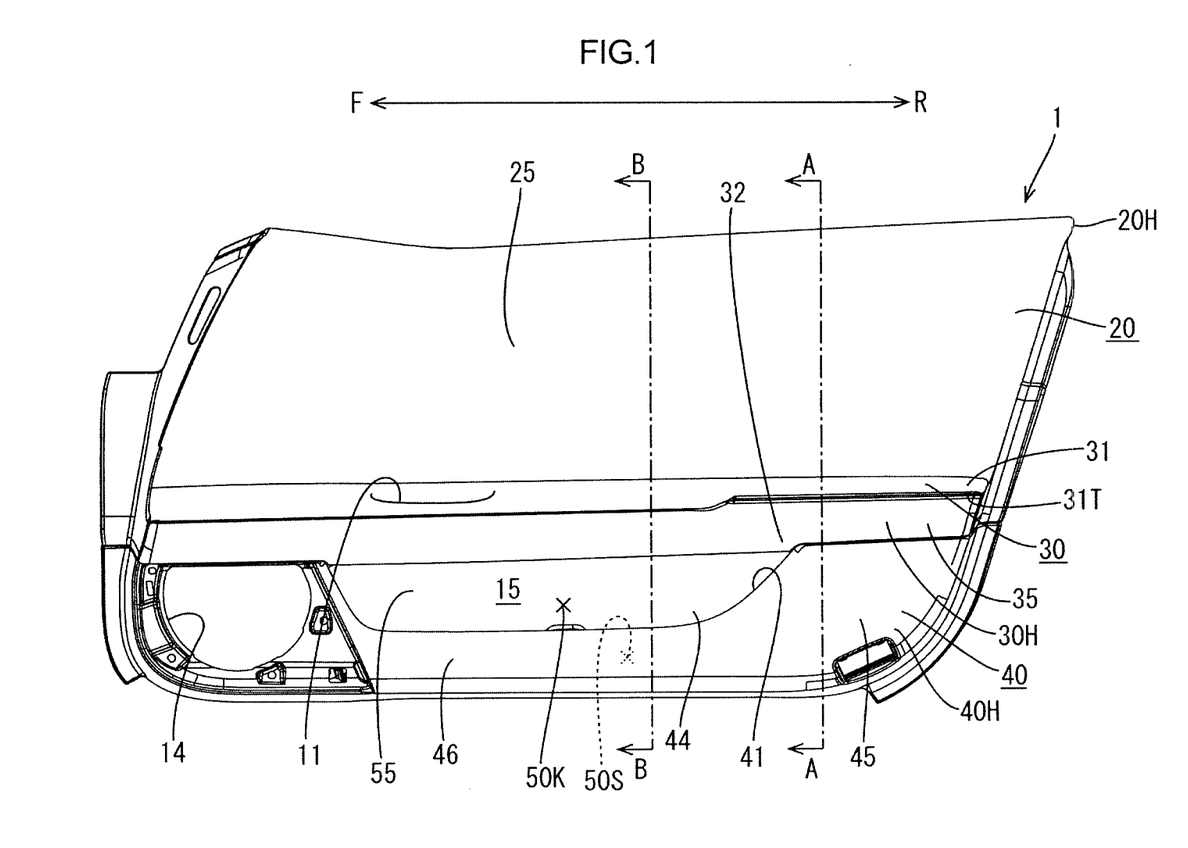
FIG. 1 is a front view of a side door trim for a vehicle according to a first embodiment viewed from an interior side of the vehicle.

As illustrated in FIG. 1, the side door trim 1 for a vehicle (hereinafter referred to as the side door trim 1) has a board shape. The side door trim 1 forms a sidewall of a vehicle compartment. The side door trim 1 has a long dimension in a front-rear direction of the vehicle and a short dimension in a top-bottom direction of the vehicle. The side door trim 1 includes an upper board 20 and a lower board 40 that are assembled together. The upper board 20, the lower board 40, and a door pocket backboard 50, which will be described later, form a wall component of the side door trim 1. More specifically, the upper board 20, the lower board 40 (a lower wall member), and the door pocket backboard 50 (a backboard member) are assembled together to form the sidewall of the vehicle compartment and referred to as the wall component. The upper board 20 and the lower board 40 form an upper portion of the side door trim 1 and a lower portion of the side door trim 1, respectively. The upper board 20 and the lower board 40 have long dimensions in the front-rear direction of the vehicle and short dimensions in the top-bottom direction of the vehicle.

The side door trim 1 includes an upper wall portion 25, an armrest portion 30 (an armrest), a first lower wall portion 45, and a second lower wall portion 46. The upper wall portion 25 is a portion of the upper board 20 forming an upper wall of the side door trim 1. The first lower wall portion 45 and the second lower wall portion 46 are portions of the lower board 40 forming a lower wall of the side door trim 1. The upper wall portion 25, the first lower wall portion 45, and the second lower wall portion 46 include wall surfaces that are arranged on an interior side of the vehicle in the vehicle compartment. The armrest portion 30 is located below the upper wall portion 25.

The wall portions 25, 45, and 46 of the side door trim 1 are formed by two boards, that is, the upper board 20 and the lower board 40. However, the side door trim 1 may include wall portions formed by a single board, as in a second embodiment, or three or more boards.

Figure 4:
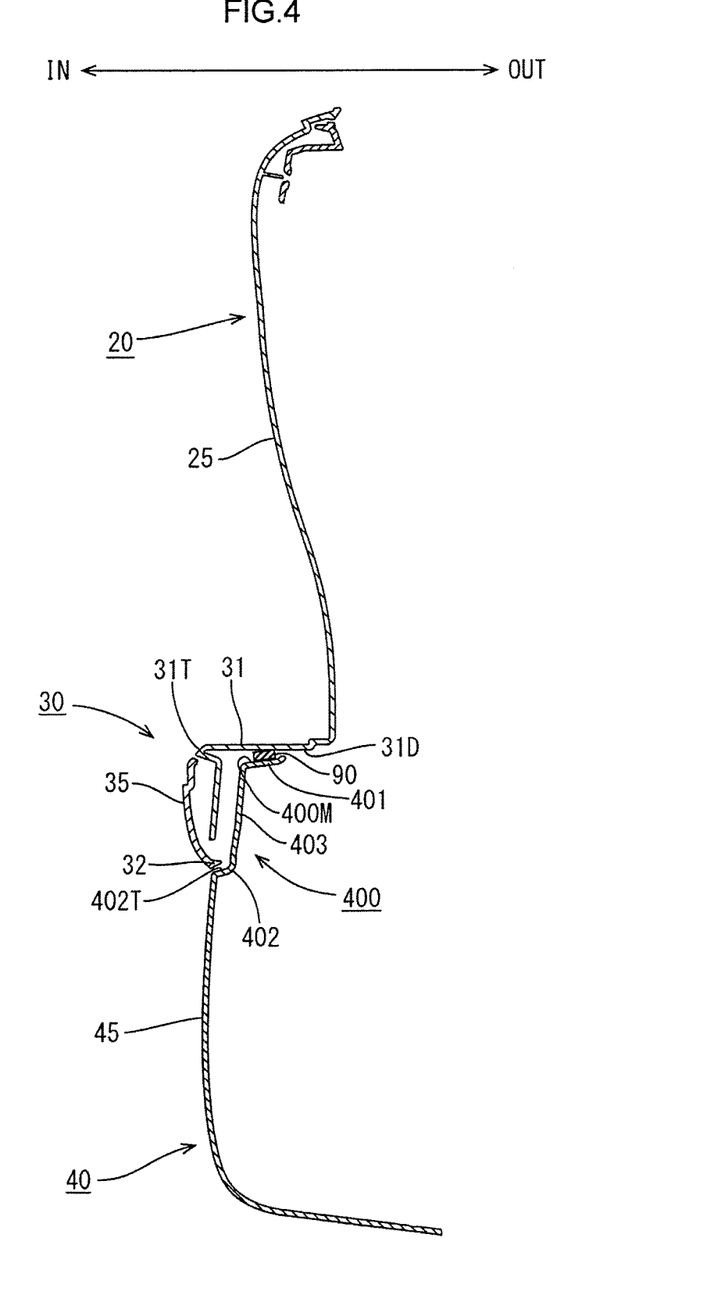
FIG. 4 is a schematic cross-sectional view along line A-A in each of FIGS. 1 to 3.

The armrest portion 30 is located at about the middle of the short dimension of the side door trim 1. Namely, the armrest portion 30 is located at a lower end of the upper wall portion 25 above the first lower wall portion 45 and the second lower wall portion 46. The armrest portion 30 protrudes to the interior side of the vehicle and extends in the front-rear direction of the vehicle. As illustrated in FIG. 4, the armrest portion 30 includes a top wall 31 and a sidewall 35. The top wall 31 is formed by bending a lower end portion of the upper board 20 to project from the wall surface of the upper wall portion 25 in a substantially horizontal direction in the vehicle compartment so that an occupant of the vehicle can rest his or her arm on the top wall 31. The top wall 31 includes a distal end 31T located inner in the vehicle compartment than an end of the top wall 31 at a boundary between the top wall 31 and the upper wall portion 25. The sidewall 35 extends downward from the distal end 31T of the top wall 31 and forms a portion of the sidewall of the vehicle compartment.

As illustrated in FIG. 1, the upper wall portion 25, the armrest portion 30, the first lower wall portion 45, and the second lower wall portion 46 are covered with an upper wall skin 20H, an armrest skin 30H, and a lower wall skin 40H to enhance appearances of the sidewall of vehicle compartment.

Figure 2:
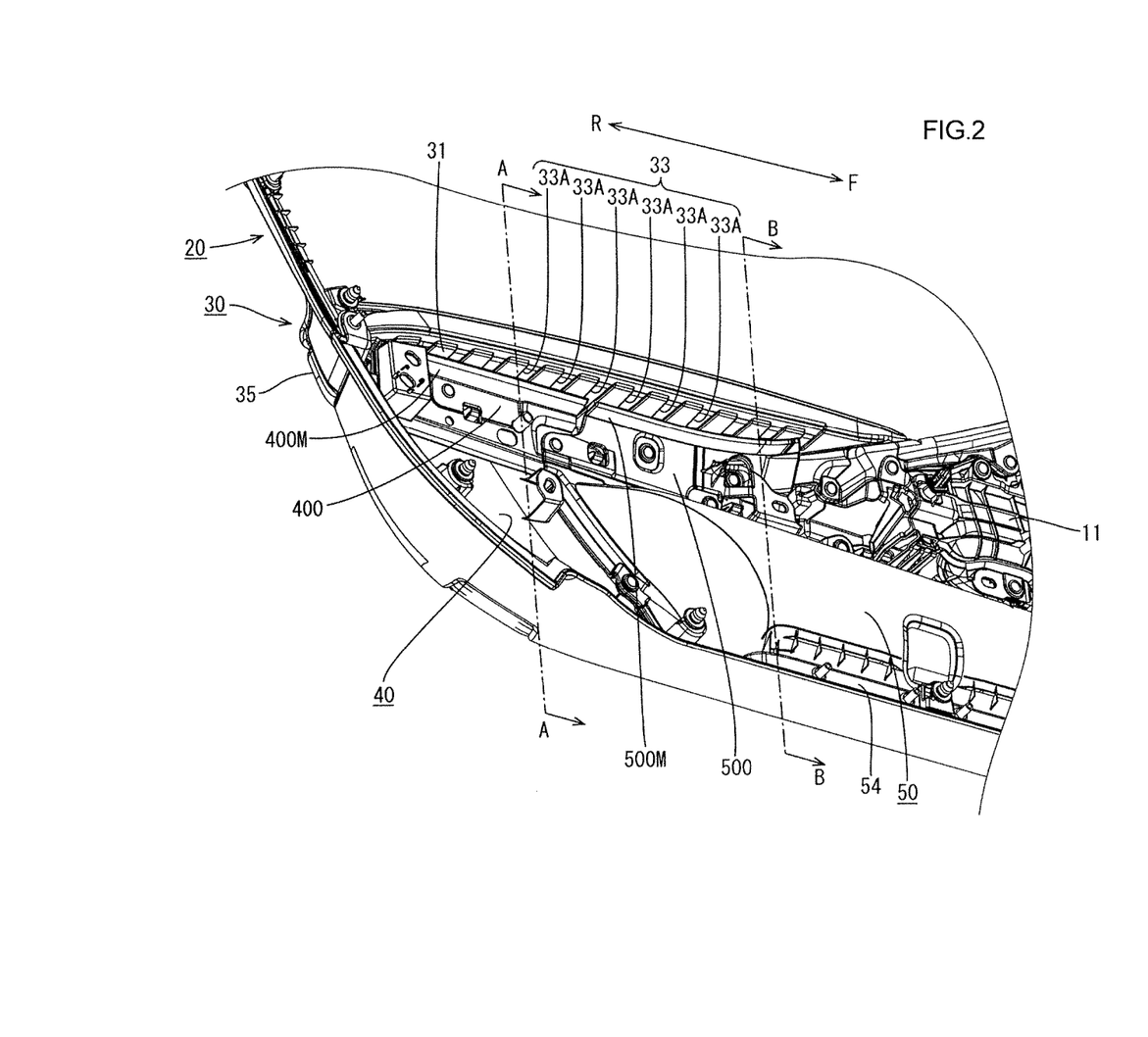
FIG. 2 is a perspective view of a portion of a backside of the side door trim in FIG. 1 illustrating supports for an top wall of an armrest.

The armrest portion 30 includes a door pulling handle 11 in a front portion thereof. The door pulling handle 11 includes a hole in the top wall 31 of the armrest portion 30. The occupant of the vehicle may insert his or her hand in the hole to open or close a door of the vehicle when he or she gets in or out of the vehicle compartment. The top wall 31 of the armrest portion 30 includes a weak portion 33 in a portion closer to a rear edge of the armrest portion 30 than the door pulling handle 11. As illustrated in FIG. 2, the weak portion 33 includes multiple through holes 33A each having long dimensions in a width direction of the armrest portion 30 corresponding to a width direction of the vehicle. The through holes 33A are arranged parallel to each other along a longitudinal direction of the armrest portion 30 corresponding to the front-rear direction of the vehicle.

The first lower wall portion 45 is arranged such that a surface of the sidewall 35 of the armrest portion 30 and the surface of the first lower wall portion 45 exposed in the vehicle compartment are continuous to each other.

The side door trim 1 includes a speaker grill 14 in a portion closer to the front edge thereof and a door pocket 15 in a portion closer to the rear edge of the side door trim 1 than the speaker grill 14. The second lower wall portion 46 is arranged between the speaker grill 14 and the first lower wall portion 45 with respect to a longitudinal direction of the side door trim 1 corresponding to the front-rear direction of the vehicle. The second lower wall portion 46 includes a cutout 44 in an upper edge portion.

Figure 5:
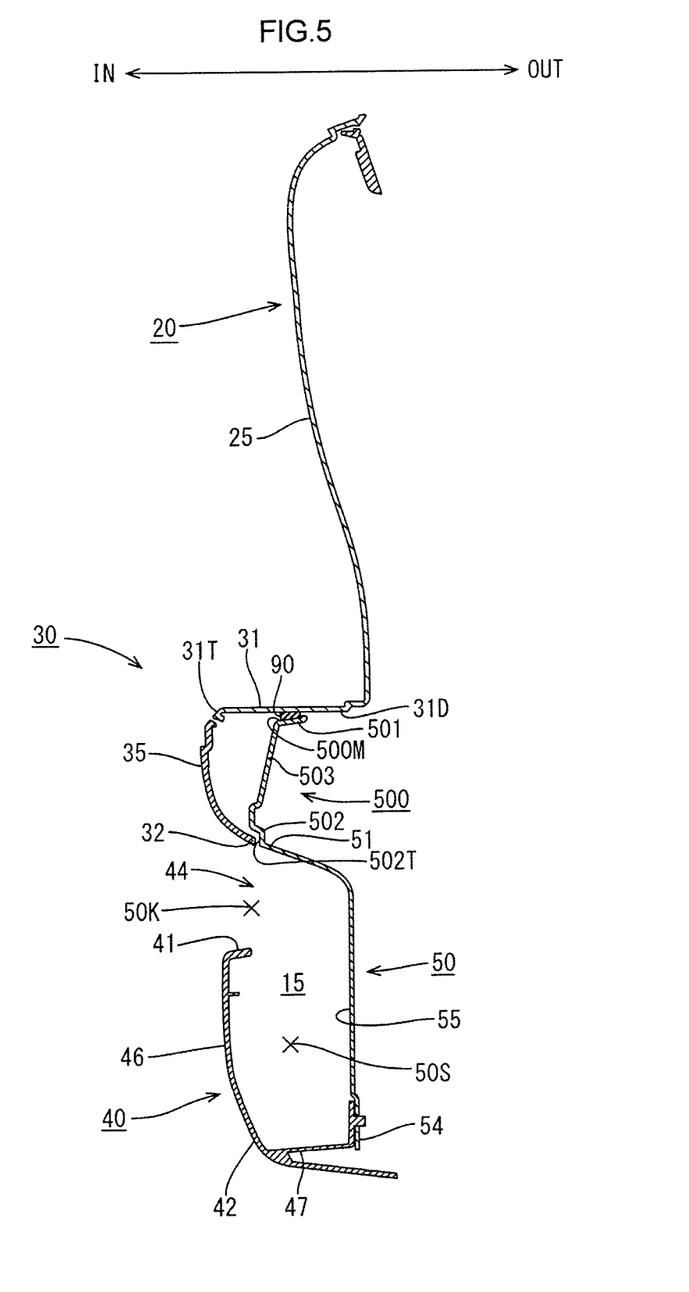
FIG. 5 is a schematic cross-sectional view along line B-B in each of FIGS. 1 to 3.

As illustrated in FIG. 5, the door pocket backboard 50 is disposed at about a center of the side door trim 1 with respect to the longitudinal direction of the side door trim 1 and a predefined distance away from a back surface of the second lower wall portion 46 such that the door pocket backboard 50 and the second lower wall portion 46 are opposed to each other. The door pocket backboard 50 and the second lower wall portion 46 define a holding space 50S of the door pocket 15 therebetween. The second lower wall portion 46 includes a curved upper edge 41 that defines the cutout 44. A lower end 32 of the armrest portion 30 and the curved upper edge 41 define a door pocket opening 50K. The occupant of the vehicle can access the holding space 50S through the door pocket opening 50K.

As described above, the second lower wall portion 46 is arranged between the speaker grill 14 and the first lower wall portion 45 and the door pocket backboard 50 is arranged at about the center of the side door trim 1 with respect to the longitudinal direction of the side door trim 1. Furthermore, the holding space 50S of the door pocket 15 is defined by the second lower wall portion 46 and the door pocket backboard 50. Namely, the door pocket 15 is located in the middle portion of the side door trim 1 with respect to the longitudinal direction of the side door trim 1.

As illustrated in FIG. 5, the lower board 40 further includes a bottom wall 47 that extends from a lower end of the second lower wall portion 46 in a direction substantially perpendicular to the wall surface of the second lower wall portion 46 toward the door pocket backboard 50. The bottom wall 47 includes a distal end that is a fixing portion to which the door pocket backboard 50 is fixed. The bottom wall 47 defines a bottom of the door pocket 15.

As illustrated in FIGS. 2 and 4, the lower board 40 includes a lower board extending portion 400 (a supporting portion) which extends from an upper end of the first lower wall portion 45 toward a lower surface 31D of the top wall 31 of the armrest portion 30. Specifically, the upper end of the first lower wall portion 45 is located closer to the rear edge of the side door trim 1 than the cutout 44. The lower board extending portion 400 extends from the upper end of the first lower wall portion 45, which is not a portion defining the door pocket opening 50K.

The lower board extending portion 400 includes an upper end portion 401, a lower end portion 402, and a middle portion 403. The lower end portion 402 extends from the upper end of the first lower wall portion 45 and curves behind the sidewall 35 of the armrest portion 30. The lower end portion 402 includes a lower end opposed surface 402T that is opposed to the lower end 32 of the armrest portion 30. The middle portion 403 located between the upper end portion 401 and the lower end portion 402 extends substantially straight toward the lower surface 31D of the top wall 31. The upper end portion 401 extends from an upper end of the middle portion 403 along the lower surface 31D of the top wall 31.

The lower board extending portion 400 has a long dimension in the front-rear direction of the vehicle. Because the lower board extending portion 400 is disposed behind the sidewall 35 of the armrest portion 30 to face the back surface of the sidewall 35, that is, more to the exterior side of the vehicle than the sidewall 35, the lower board extending portion 400 is invisible from the vehicle compartment side. The wall surface of the first lower wall portion 45 exposed in the vehicle compartment is a designed surface that is disposed more to the interior side of the vehicle than the lower board extending portion 400. The lower board extending portion 400 including the lower end opposed surface 402T opposed to the lower end 32 of the armrest portion 30 is disposed more to the exterior side of the vehicle than the first lower wall portion 45.

The upper end portion 401 includes an armrest supporting surface 400M that extends along the lower surface 31D of the top wall 31 and faces the lower surface 31D. The armrest supporting surface 400M has a long dimension in the longitudinal direction of the side door trim 1. A cushion member 90 is disposed on the armrest supporting surface 400M. More specifically, the cushion member 90 is sandwiched between the lower surface 31D of the top wall 31 and the armrest supporting surface 400M. The lower board extending portion 400 supports the lower surface 31D of the top wall 31 from below via the cushion member 90 disposed on the armrest supporting surface 400M.

The upper end portion 401 or the armrest supporting surface 400M is not fixed to the lower surface 31D of the top wall 31 and movable in the width direction of the vehicle separately from the top wall 31. The upper end portion 401 is designed in consideration of not only comfort of an occupant of the vehicle who rests his or her arm on the top wall 31 of the armrest portion 30 but also a tolerance of the lower board extending portion 400 to the downward force applied to the armrest portion 30. To reduce a collapse of the lower board extending portion 400 due to a downward force applied to the armrest portion 30 from above, a dimension of the armrest supporting surface 400M in the width direction of the vehicle is set to a minimum.

As illustrated in FIGS. 2 and 5, the door pocket backboard 50 includes a flat portion 55 and a curved portion 51 (a backboard wall portion) to form the holding space 50S together with the lower board 40. The flat portion 55 has a long dimension in a direction parallel to the long dimension of the side door trim 1 corresponding to the front-rear direction of the vehicle and a short dimension in a direction parallel to the short dimension of the side door trim 1 corresponding to the top-bottom direction of the vehicle. The curved portion 51 curves from an upper end of the flat portion 55 toward the lower end 32 of the armrest portion 30. An upper end of the curved portion 51 is located adjacent to the lower end 32 of the armrest portion 30. The flat portion 55 is opposed to a back surface of the second lower wall portion 46 of the lower board 40 to define a backside of the holding space 50S. The curved portion 51 defines a backside of the door pocket opening 50K. The door pocket backboard 50 further includes a flange portion 54 at a bottom edge. The flange portion 54 is a fixing portion for fixing the door pocket backboard 50 to the lower board 40 with the door pocket backboard 50 a predefined distance away from the back surface of the lower board 40. The flange portion 54 is fixed to the fixing portion of the bottom wall 47 of the lower board 40 with the flat portion 55 the predefined distance away from the back surface of the lower board.

As illustrated in FIGS. 2 and 5, the door pocket backboard 50 includes a door pocket backboard extending portion 500 (a supporting portion). The door pocket backboard extending portion 500 extends from an upper end of the curved portion 51 adjacent to the lower end 32 of the armrest portion 30 toward the lower surface 31D of the top wall 31 of the armrest portion 30. More specifically, the door pocket backboard extending portion 500 extends from a portion of the upper end of the curved portion 51 corresponding to the weak portion 33 of the top wall 31 of the armrest portion 30 located closer to the rear edge of the side door trim 1 than the door pulling handle 11.

The door pocket backboard extending portion 500 is disposed behind the sidewall 35 of the armrest portion 30 to face a back surface of the sidewall 35 of the armrest portion 30. Therefore, the door pocket backboard extending portion 500 is invisible from the interior side of the vehicle in the vehicle compartment.

The door pocket backboard extending portion 500 includes an upper end portion 501, a lower end portion 502, and a middle portion 503. The lower end portion 502 includes a lower end opposed surface 502T that is opposed to the lower end 32 of the armrest portion 30. The middle portion located between the upper end portion 501 and the lower end portion 502 extends upward from an upper end of the lower end portion 502 toward the lower surface 31D of the top wall 31. The upper end portion 501 extends from an upper end of the middle portion 503 along the lower surface 31D of the top wall 31.

The upper end portion 501 includes an armrest supporting surface 500M that extends along the lower surface 31D of the top wall 31 and faces the lower surface 31D. The armrest supporting surface 500M has a long dimension in a direction parallel to the long dimension of the side door trim 1. A cushion member 90 is disposed on the armrest supporting surface 500M. More specifically, the cushion member 90 is sandwiched between the armrest supporting surface 500M and the lower surface 31D of the top wall 31 of the armrest portion 30. The door pocket backboard extending portion 500 supports the lower surface 31D of the top wall of the armrest portion 30 from below via the cushion member 90 on the armrest supporting surface 500M of the upper end portion 501.

The armrest supporting surface 500M of the upper end portion 501 is not fixed to the lower surface 31D of the top wall 31 and thus the upper end portion 501 is movable in the width direction of the vehicle separately from the top wall 31. The upper end portion 501 is designed in consideration of not only comfort of an occupant of the vehicle who rests his or her arm on the top wall 31 of the armrest portion 30 but also a tolerance of the door pocket backboard extending portion 500 to a downward force applied to the armrest portion 30. To reduce a collapse of the door pocket backboard extending portion 500 due to the downward force, a dimension of the armrest supporting surface 500M in the width direction of the vehicle is set to a minimum.

Figure 3:
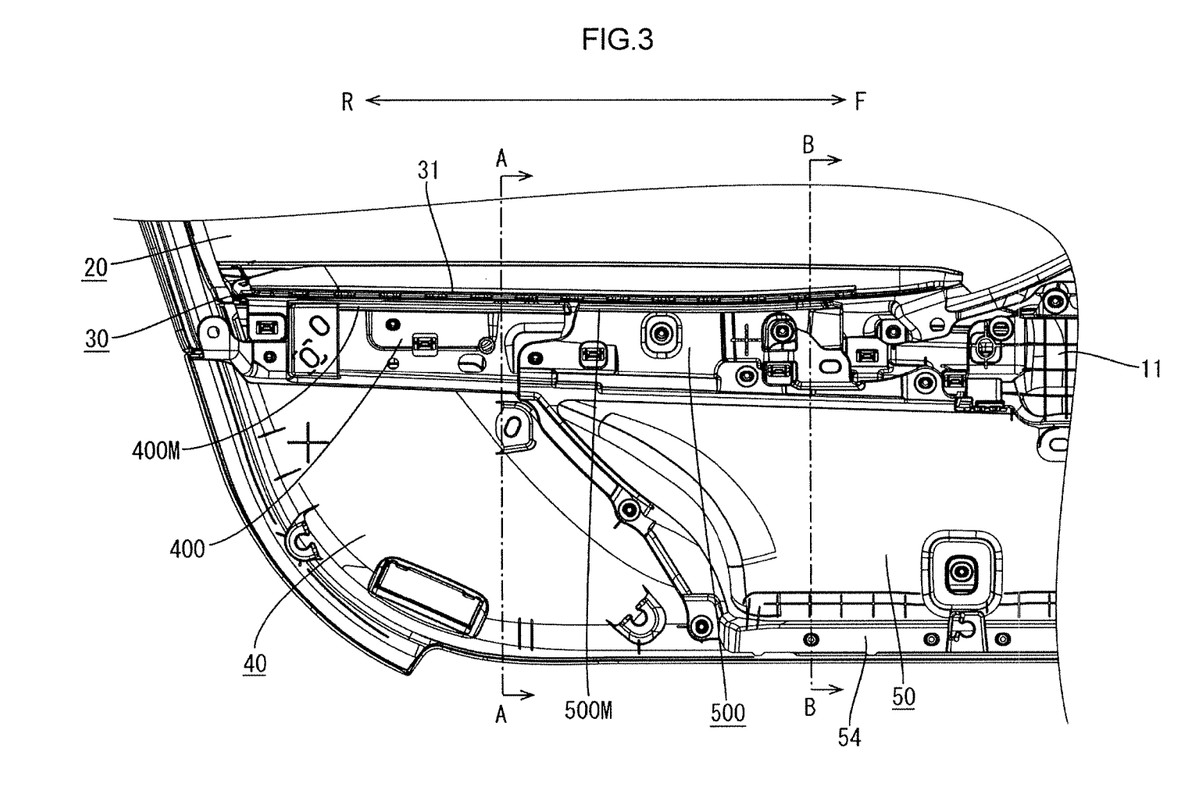
FIG. 3 is a view of the portion in FIG. 2 from an exterior side of the vehicle.

As illustrated in FIGS. 2 and 3, the portion of the top wall 31 of the armrest portion 30 located closer to the rear edge of the side door trim 1 than the door pulling handle 11 is supported by the lower board extending portion 400 and the door pocket backboard extending portion 500 that are continuous to each other in the direction parallel to the long dimension of the side door trim 1. According to the configuration, the armrest portion 30 has a tolerance to a downward force applied to the armrest 30 by an occupant of the vehicle when he or she rests his or her arm on the armrest portion 30.

When a side impact is applied to the sidewall 35 of the armrest portion 30 in a side collision and transferred to the lower board extending portion 400 and the door pocket backboard extending portion 500, the lower board extending portion 400 and the door pocket backboard extending portion 500 disposed more to the exterior side of the vehicle than the sidewall 35 collapse. In the side collision, the side impact is transferred directly from the lower end 32 of the sidewall 35 to the lower end portion 402 of the lower board extending portion 400 and the lower end portion 502 of the door pocket backboard extending portion 500 and the extending portions 400 and 500 collapse. Because the upper end portions 401 and 501 are not fixed to the top wall 31 of the armrest portion 30, the upper end portions 401 and 501 move away from the lower surface 31D of the top wall 31. As a result, the top wall 31 of the armrest portion 30 loses support from the extending portions 400 and 500 and the armrest portion 30 collapses in the width direction of the vehicle. The weak portion 33 of the top wall 31 accelerates the collapse of the top wall 31 that has lost the support from the extending portions 400 and 500. Therefore, the side impact is properly absorbed by the armrest portion 30.

As described above, the side door trim 1 includes the armrest portion 30 and the wall component including the upper board 20, the lower board 40, and the door pocket backboard 50. A portion of the wall component disposed under the armrest portion 30 forms a portion of the sidewall of the vehicle compartment. The armrest portion 30 includes the top wall 31 on which an occupant of the vehicle can rest his or her arm. The wall component including the lower board 40 and the door pocket backboard 50 includes the supporting portion including the lower board extending portion 400 and the door pocket backboard extending portion 500 that extend toward the lower surface 31D of the top wall 31 of the armrest portion 30 and support the lower surface 31D from below.

The supporting portion including the lower board extending portion 400 and the door pocket backboard extending portion 500 disposed below the top wall 31 of the armrest portion 30 supports the top wall 31 from below. Namely, the top wall 31 is tolerant to a downward force applied to the top wall 31 with the support of the extending portions 400 and 500, which are portions of the component different from the armrest portion 30. According to the configuration, the armrest portion 30 has a tolerance to the downward force. Furthermore, in comparison to a configuration in which an armrest and a supporting portion to support the armrest are integrally formed, the movement of the supporting portion including the lower board extending portion 400 and the door pocket backboard extending portion 500 in the width direction of the vehicle in a side collision is less likely to be restricted. Therefore, the top wall 31 of the armrest portion 30 is more likely to collapse. Because the supporting portion to support the armrest portion 30 to tolerate the downward force is not included in the armrest portion 30, the lower board extending portion 400 and the door pocket backboard extending portion 500 collapse when a side impact is applied to the supporting portion without restricting the move of the armrest portion 30 and easily move away from the lower surface 31D of the top wall 31 of the armrest portion 30. According to the configuration, the top wall 31 can be designed with a longer dimension in the width direction of the vehicle to improve a shock absorbing performance of the armrest portion 30.

The armrest portion 30 includes the sidewall 35 that extends downward from the distal end 31T of the top wall 31 and forms a portion of the sidewall of the vehicle compartment. The supporting portion including the extending portions 400 and 500 is disposed more to the exterior side of the vehicle than the sidewall 35 of the armrest portion 30 and is not fixed to the lower surface 31D of the top wall 31 of the armrest portion 30.

According to the configuration, the supporting portion including the extending portions 400 and 500 is more likely to move away from the lower surface 31D in a side collision. As a result, the top wall 31 loses the support from below and is more likely to collapse in the width direction of the vehicle and thus a side impact is absorbed. Furthermore, the supporting portion including the extending portions 400 and 500 is disposed more to the exterior side of the vehicle than the sidewall 35 of the armrest portion 30. The support portion including the extending portions 400 and 500, the top wall 31 of the armrest portion 30, and the sidewall 35 of the armrest portion 30 form a closed space. In a normal condition, the support portion including the extending portions 400 and 500, the top wall 31 of the armrest portion 30, and the sidewall 35 of the armrest portion 30 provide proper strength. In a side collision, the supporting portion including the extending portions 400 and 500 collapses and opens up the space. As a result, the strength decreases and the side impact is more likely to be absorbed.

The top wall 31 of the armrest portion 30 includes the weak portion 33. In a side collision, the top wall 31 collapses when the supporting portion including the extending portions 400 and 500 supporting the top wall 31 of the armrest portion 30 form below collapses and moves away from the top wall 31. The weak portion 33 accelerates the collapse of the top wall 31, that is, improves the shock absorbing performance of the armrest portion 30.

If each of the through holes 33A in the weak portion 33 has a long dimension in the front-rear direction of the vehicle, the supporting portion including the extending portions 400 and 500 needs to be disposed in a portion of the top wall 31 in which the through holes 33A are not formed in consideration of movement of the supporting portion in the width direction of the vehicle in a side collision. In this embodiment, each of the through holes 33A has the long dimension in the width direction of the vehicle and the supporting portion that has a long dimension in the front-rear direction of the vehicle is disposed under the top wall 31 of the armrest portion 30 including the through holes 33A to support the top wall 31. According to the configuration, the through holes 33A are less likely to restrict the move of the supporting portion. Therefore, flexibility in arrangement of the supporting portion, or the extending portions 400 and 500, increases.

Second Embodiment

Figure 6:
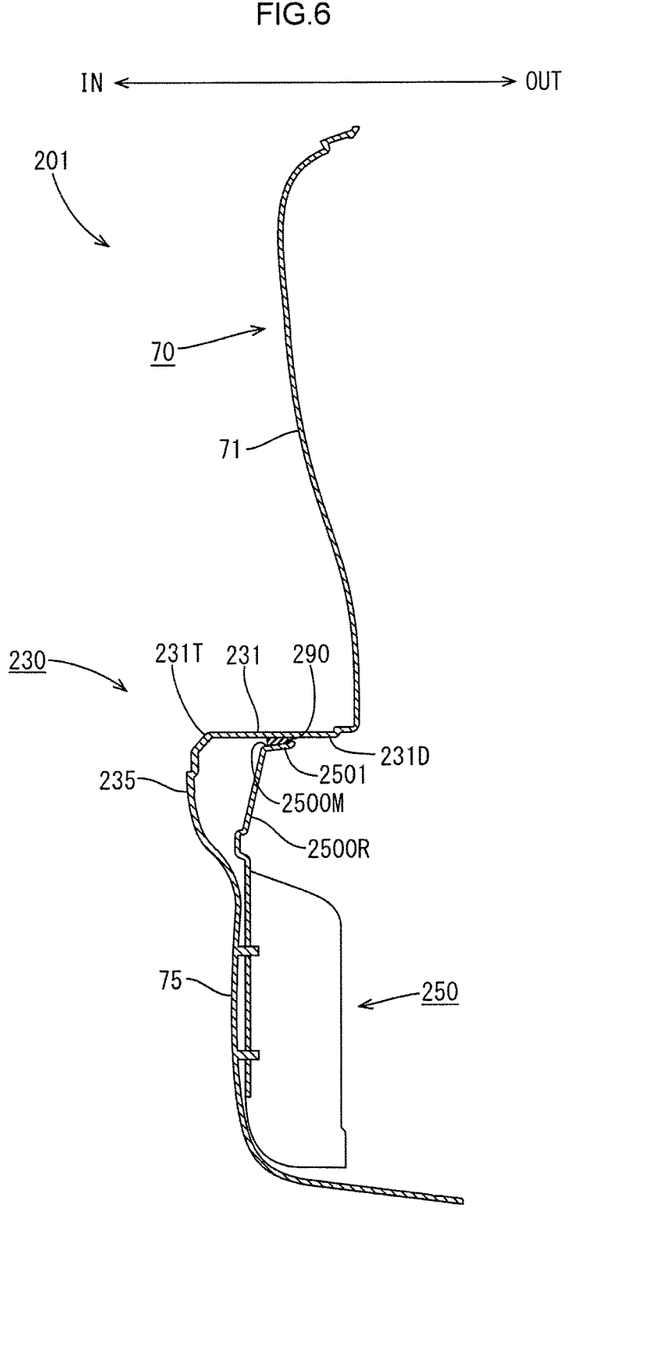
FIG. 6 is a cross-sectional view of a side door trim for a vehicle according to a second embodiment.
Figure 7:
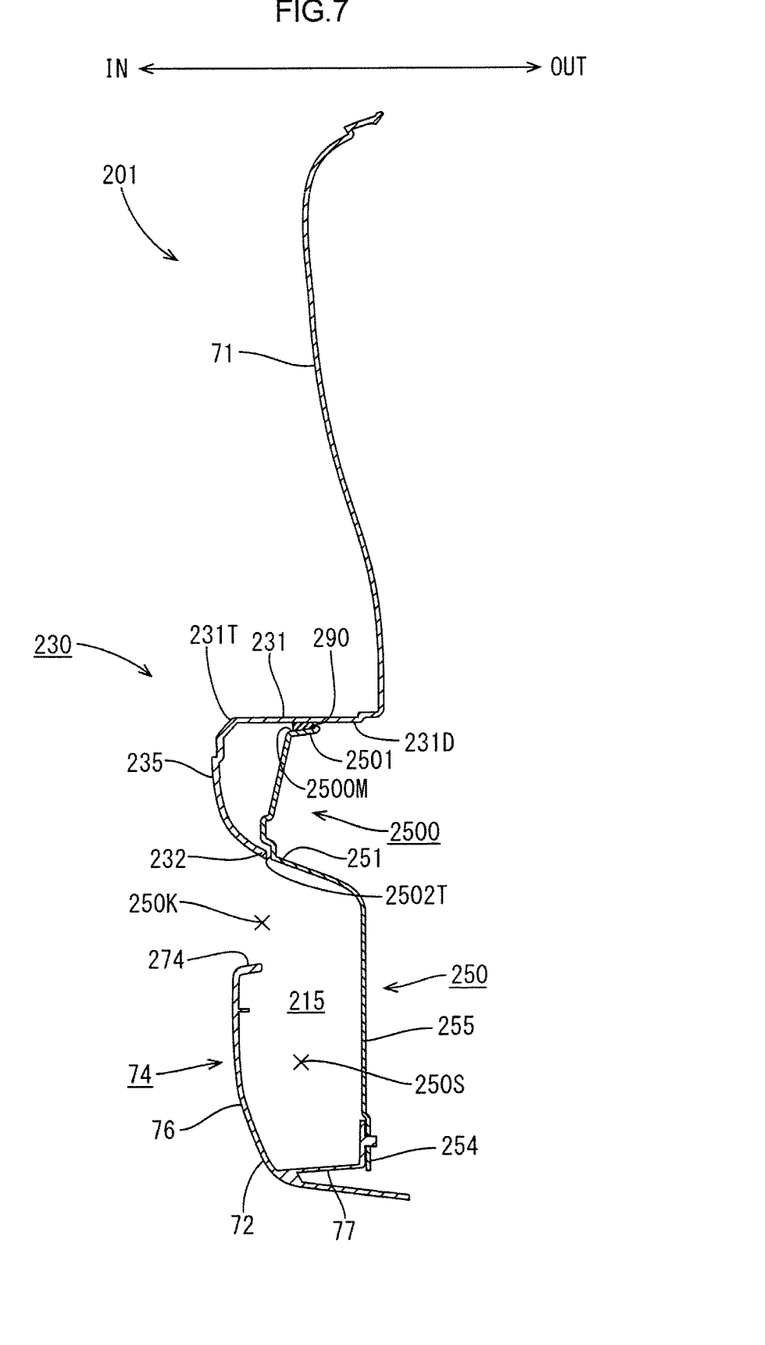
FIG. 7 is a cross-sectional view of the side door trim for a vehicle according to the second embodiment.

A second embodiment will be described with reference to FIGS. 6 and 7. The second embodiment includes a component different from the first embodiment. The same components as those of the first embodiment will be indicated by the same symbols. Configurations, functions, and effects of the second embodiment the same as those of the first embodiment will not be described. In this section, a side door trim 201 installed in a vehicle will be described.

The side door trim 201 has a long dimension in the front-rear direction of the vehicle and a short dimension in the top-bottom direction of the vehicle. As illustrated in FIG. 6, the side door trim 201 includes a single main board 70 (a wall component) and a door pocket backboard 250. The main board 70 (a main wall member) includes an upper wall portion 71, an armrest portion 230 (an armrest), and a lower wall portion 74. The armrest portion 230 is in a portion located at about the middle of the short dimension of the side door trim 201 between the upper wall portion 71 and the lower wall portion 74. The armrest portion 230 has a shape that protrudes more to the interior side of the vehicle than the upper wall portion 71. The armrest portion 230 includes a top wall 231 and a sidewall 235. The top wall 231 extends from a lower end of the upper wall portion 71 in a width direction of the armrest portion 230 corresponding to the width direction of the vehicle toward the interior side of the vehicle. An occupant of the vehicle can rest his or her arm on the top wall 231. The sidewall 235 extends downward from a distal end 231T of the top wall 231 and forms a portion of a sidewall of the vehicle compartment.

The upper wall portion 71 has a long dimension in direction parallel to the long dimension of the side door trim 201 and a short dimension in a direction parallel to the short dimension of the side door trim 201. The lower wall portion 74 has a long dimension in a direction parallel to the long dimension of the side door trim 201 and a short dimension in a direction parallel to the short dimension of the side door trim 201.

The lower wall portion 74 includes a first lower wall portion 75 and a second lower wall portion 76. The first lower wall portion 75 and the second lower wall portion 76 are located below the armrest portion 230. The second lower wall portion 76 includes an upper end 274 that is located lower than an upper end of the first lower wall portion 75.

The main board 70 further includes a bottom wall portion 77 that extends from a lower end 72 of the main board 70 in a direction substantially perpendicular to the lower wall portion 74 toward the door pocket backboard 250. The bottom wall portion 77 includes a distal end that is a fixing portion to which the door pocket backboard 250 is fixed.

The door pocket backboard 250 includes a flat portion 255 and a curved portion 251 to define a holding space 250S together with the second lower wall portion 76. The flat portion 255 has a long dimension in a direction parallel to the long dimension of the side door trim 201 corresponding to the front-rear direction of the vehicle and a short dimension in a direction parallel to the short dimension of the side door trim 201 corresponding to the top-bottom direction of the vehicle. The curved portion 251 curves from an upper end of the flat portion 255 toward a lower end 232 of the armrest portion 230. The door pocket backboard 250 further includes a flange portion 254 at a bottom edge. The flange portion 254 is a fixing portion for fixing the door pocket backboard 250 to the main board 70 with the door pocket backboard 250 a predefined distance away from a back surface of the second lower wall portion 76. The flange portion 254 is fixed to the fixing portion of the main board 70 with the flat portion 255 the predefined distance away from the back surface of the second lower wall portion 76.

The side door trim 201 includes a door pocket 215 in a portion located at about the middle of the long dimension under the armrest portion 230. The door pocket 215 includes a door pocket opening 250K and the holding space 250S. The occupant of the vehicle can access the holding space 250S through the door pocket opening 250K. The door pocket opening 250K is defined by a lower end of the armrest portion 230 and the upper end 274 of the second lower wall portion 76. The holding space 250S is defined by the second lower wall portion 76 and the door pocket backboard 250. A bottom of the holding space 250S is defined by the bottom wall portion 77.

The door pocket backboard 250 includes a door pocket backboard extending portion 2500 (a supporting portion). The door pocket backboard extending portion 2500 extends from an upper end of the curved portion 251 adjacent to the lower end of the armrest portion 230 toward a lower surface 231D of the top wall 231 of the armrest portion 230. More specifically, the door pocket backboard extending portion 2500 extends from a portion of the upper end of the curved portion 251 corresponding to a weak portion 233 of the top wall 231 of the armrest portion 230 located more to the rear of the vehicle than the door pulling handle 11.

The curved portion 251 of the door pocket backboard extending portion 2500 has a long dimension in a direction parallel to the long dimension of the side door trim 201. The door pocket backboard extending portion 2500 includes a rear supporting portion 2500R located closer to a rear edge of the side door trim 201 than the curved portion 251 and the flat portion 255. Namely, the door pocket backboard extending portion 2500 is a only a portion of the side door trim 201 projecting more to the rear of the vehicle than the door pocket 215 in which the holding space 250S is not provided.

The door pocket backboard extending portion 2500 includes an upper end portion 2501, a lower end portion 2502, and a middle portion 2503. The lower end portion 2502 includes a lower end opposed surface 2502T that is opposed to the lower end 232 of the armrest portion 230. The middle portion 2503 located between the upper end portion 2501 and the lower end portion 2502 extends upward from an upper end of the lower end portion 2502 toward the lower surface 231D of the top wall 231. The upper end portion 2501 extends from an upper end of the middle portion 2503 along the lower surface 231D of the top wall 231.

The upper end portion 2501 includes an armrest supporting surface 2500M that extends along the lower surface 231D of the top wall 231 and faces the lower surface 231D. The armrest supporting surface 2500M has a long dimension in a direction parallel to the long dimension of the side door trim 201. A cushion member 290 is disposed on the armrest supporting surface 2500M. More specifically, the cushion member is sandwiched between the armrest supporting surface 2500M and the lower surface 231D of the top wall 231 of the armrest portion 230. The door pocket backboard extending portion 2500 supports the lower surface 231D of the top wall of the armrest portion 230 from below via the cushion member 290 disposed on the armrest supporting surface 2500M of the upper end portion 2501.

Other Embodiments

The technology described herein is not limited to the above embodiments described above and the drawings. The following embodiments may be included in the technical scope of the present invention.

A supporting member may be provided as a separate component from a lower board or a door pocket backboard for supporting the top wall 31 or 231.

What is claimed is:

1. A side door trim for a vehicle comprising:
   an armrest including a top wall configured to support an arm of an occupant of the vehicle; and
   a wall component configured to provide a portion of a sidewall of a vehicle compartment, the wall component including:
     a lower wall portion located below the armrest; and
     a supporting portion that supports the top wall of the armrest from below, the supporting portion extending from an upper end of the lower wall portion of the wall component adjacent to a lower end of the armrest toward a lower surface of the top wall of the armrest, the supporting portion includes an upper end portion, a lower end portion, and a middle portion, wherein
   the middle portion extends toward the top wall of the armrest, and
   the upper end portion extends from an upper end of the middle portion along the top wall of the armrest at an angle relative to the middle portion.

2. The side door trim according to claim 1, wherein
   the wall component includes a wall surface configured to be arranged on an interior side of the vehicle when the side door trim is installed in the vehicle,
   the top wall of the armrest projects from the wall surface of the wall component,
   the armrest includes a sidewall extending downward from a distal end of the top wall of the armrest that is configured to provide another portion of the sidewall of the vehicle compartment,
   the supporting portion is disposed opposite a back surface of the sidewall of the armrest, and
   the supporting portion is not fixed to the lower surface of the top wall of the armrest.

3. The side door trim according to claim 2, wherein
   the wall component includes a lower wall member and a backboard member,
   the lower wall member includes a first lower wall portion and a second lower wall portion,
   the backboard member includes a backboard wall portion,
   the lower wall member and the backboard member are disposed such that the second lower wall portion and the backboard wall portion are opposed to each other with a predefined distance away from each other to define a holding space between the second lower wall portion and the backboard wall portion,
   the second lower wall portion of the lower wall member includes a cutout in an upper end portion for access to the holding space,
   the upper end of the lower wall portion of wall component includes an upper end of the first lower wall portion of the lower wall member and an upper end of the backboard wall portion of the backboard member,
   the supporting portion includes a first supporting portion and a second supporting portion,
   the first supporting portion is included in the lower wall member,
   the first supporting portion extends from the upper end of the first lower wall portion of the lower wall member toward the lower surface of the top wall of the armrest,
   the second supporting portion is included in the backboard member, and
   the second supporting portion extends from the upper end of the backboard wall portion of the backboard member toward the lower surface of the top wall of the armrest.

4. The side door trim according to claim 3, wherein
   the lower wall member and the backboard member are separate components that are assembled together, and
   the armrest is a component separate from the lower wall member and the backboard member.

5. The side door trim according to claim 3, wherein
   the backboard wall portion includes a flat portion and a curved portion,
   the flat portion is opposed to a back surface of the second lower wall portion,
   the curved portion curves from an upper end of the flat portion toward the lower end of the armrest, and
   the upper end of the backboard wall portion is the upper end of the curved portion.

6. The side door trim according to claim 3, wherein
   the lower wall member includes a bottom wall extending from a lower end of the second lower wall portion in a direction substantially perpendicular to the second lower wall portion toward the backboard member,
   the bottom wall includes a distal end that is a fixing portion to which the backboard member is fixed,
   the backboard member includes a flange portion at a bottom edge of the backboard member, and
   the flange portion is fixed to the fixing portion of the bottom wall of the lower wall member with the backboard wall portion the predefined distance away from the back surface of the second lower wall portion of the lower wall member.

7. A side door trim for a vehicle comprising:
   an armrest including:
     a top wall configured to support an arm of an occupant of the vehicle; and
     a sidewall extending downward from a distal end of the top wall of the armrest that is configured to provide a portion of a sidewall of a vehicle compartment; and
   a wall component that is configured to provide another portion of the sidewall of the vehicle compartment, the wall component including:
     a lower wall portion located below the armrest;
     a supporting portion that supports the top wall of the armrest from below, the supporting portion extending from an upper end of the lower wall portion of the wall component adjacent to a lower end of the armrest toward a lower surface of the top wall of the armrest, the supporting portion is disposed opposite a back surface of the sidewall of the armrest and the supporting portion is not fixed to the lower surface of the top wall of the armrest;
     a wall surface configured to be arranged on an interior side of the vehicle when the side door trim is installed in the vehicle;
     a lower wall member including a first lower wall portion and a second lower wall portion; and
     a backboard member including a backboard wall portion, wherein
   the top wall of the armrest projects from the wall surface of the wall component,
   the lower wall member and the backboard member are disposed such that the second lower wall portion and the backboard wall portion are opposed to each other with a predefined distance away from each other to define a holding space between the second lower wall portion and the backboard wall portion, the second lower wall portion of the lower wall member includes a cutout in an upper end portion that provides access to the holding space, the upper end of the lower wall portion of the wall component includes an upper end of the first lower wall portion of the lower wall member and an upper end of the backboard wall portion of the backboard member, the supporting portion includes:
  a first supporting portion that is included in the lower wall member and that extends from the upper end of the first lower wall portion of the lower wall member toward the lower surface of the top wall of the armrest; and
  a second supporting portion that is included in the backboard member and that extends from the upper end of the backboard wall portion of the backboard member toward the lower surface of the top wall of the armrest, the first supporting portion includes:
  an upper end portion;
  a lower end portion that extends from the upper end of the first lower wall portion and curves behind the sidewall of the armrest; and
  a middle portion located between the upper end portion and the lower end portion and that extends substantially straight toward the lower surface of the top wall of the armrest, the upper end portion of the first supporting portion extends from an upper end of the middle portion of the first supporting portion along the lower surface of the top wall of the armrest, the second supporting portion includes:
  an upper end portion;
  a lower end portion that extends from the upper end of the backboard wall portion of the backboard member toward the lower surface of the top wall of the armrest behind the sidewall of the armrest; and
  a middle portion located between the upper end portion and the lower end portion and that extends substantially straight toward the lower surface of the top wall of the arm rest, and the upper end portion of the second supporting portion extends from an upper end of the middle portion of the second supporting portion along the lower surface of the top wall of the armrest.

8. The side door trim according to claim 7, wherein the lower end portion of the first supporting portion includes a lower end opposed surface opposed to the lower end of the armrest, and
the lower end portion of the second supporting portion includes a lower end opposed surface opposed to the lower end of the armrest.

9. The side door trim according to claim 1, further comprising a cushion member sandwiched between the lower surface of the top wall of the armrest and the upper end portion of the supporting portion, which is disposed adjacent to the lower surface of the top wall of the armrest.

10. The side door trim according to claim 7, further comprising a cushion member sandwiched between the lower surface of the top wall of the armrest and the upper end portion of the first supporting portion and between the lower surface of the top wall of the armrest and the upper end portion of the second supporting portion.

11. The side door trim according to claim 2, wherein the wall component includes a main wall member and a backboard member,
the main wall member includes an upper wall portion and a lower wall portion,
the armrest is located between the upper wall portion and the lower wall portion,
the upper wall portion, the lower wall portion, and the armrest are integrally formed,
the backboard member includes a backboard wall portion and a rear supporting portion,
the lower wall portion of the wall component includes the lower wall portion of the main wall member and the backboard wall portion of the backboard member,
the main wall member and the backboard member are disposed such that the lower wall portion of the main wall member and the backboard wall portion of the backboard member are opposed to each other with a predefined distance away from each other to define a holding space between the second lower wall portion and the backboard wall portion,
the upper end of the lower wall portion includes an upper end of the backboard wall portion,
the rear supporting portion of the backboard member projects from a rear edge of the backboard wall portion in a direction parallel to a longitudinal dimension of the side door trim corresponding to a front-rear direction of the vehicle, and
the rear supporting portion of the backboard member includes an upper end portion that is located adjacent to the lower surface of the top wall of the armrest.

12. The side door trim according to claim 11, wherein the rear supporting portion of the backboard member includes a lower portion that is opposed to the lower wall portion of the main wall member, and
the lower portion of the rear supporting portion of the backboard member is fixed to the lower wall portion of the main wall member.

13. The side door trim according to claim 11, further comprising a cushion member sandwiched between the lower surface of the top wall of the armrest and the upper end portion of the supporting portion and between the lower surface of the top wall of the armrest and the upper end portion of the rear supporting portion.

14. The side door trim according to claim 1, wherein the top wall of the armrest includes a weak portion.

15. The side door trim according to claim 14, wherein the supporting portion has a longitudinal dimension in a longitudinal direction of the armrest corresponding to a front-rear direction of the vehicle, and
the weak portion includes a plurality of holes each having longitudinal dimensions in a width direction of the armrest corresponding to a width direction of the vehicle.

* * * * *